United States Patent
Suzuki (10) Patent No.: US 9,594,466 B2
(45) Date of Patent: Mar. 14, 2017

(54) INPUT DEVICE

(71) Applicant: DENSO CORPORATION, Kariya, Aichi-pref. (JP)

(72) Inventor: Tsuyoshi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/780,973

(22) PCT Filed: Mar. 27, 2014

(86) PCT No.: PCT/JP2014/001775
§ 371 (c)(1),
(2) Date: Sep. 28, 2015

(87) PCT Pub. No.: WO2014/162697
PCT Pub. Date: Oct. 9, 2014

(65) Prior Publication Data
US 2016/0062507 A1 Mar. 3, 2016

(30) Foreign Application Priority Data

Apr. 2, 2013 (JP) .................................. 2013-077248
Jan. 29, 2014 (JP) .................................. 2014-014760

(51) Int. Cl.
*G06F 3/041* (2006.01)
*G06F 3/044* (2006.01)
(Continued)

(52) U.S. Cl.
CPC ........... *G06F 3/044* (2013.01); *G01C 21/265* (2013.01); *G06F 3/041* (2013.01); *G06F 3/0412* (2013.01);
(Continued)

(58) Field of Classification Search
None
See application file for complete search history.

(56) References Cited

U.S. PATENT DOCUMENTS

2010/0073291 A1 3/2010 Hisatsugu et al.
2011/0128164 A1 6/2011 Kang et al.
(Continued)

FOREIGN PATENT DOCUMENTS

JP 2000347787 A 12/2000
JP 2010061224 A 3/2010
(Continued)

OTHER PUBLICATIONS

International Search Report and Written Opinion (in Japanese with English Translation) for PCT/JP2014/001775, mailed Jun. 17, 2014; ISA/JP.

*Primary Examiner* — Nicholas Lee
(74) *Attorney, Agent, or Firm* — Harness, Dickey & Pierce, P.L.C.

(57) ABSTRACT

An input device separated from a display unit for switchably displaying images hierarchized in hierarchy levels and configured to input a finger operation of a user to an operation surface to operate the images is provided. The input device includes a detector for detecting an operation state of the finger to the operation surface at a time of the finger operation and a controller for, when determining that the operation state detected by the detector is a proximity state, reducing sharpness of at least part of the image displayed on the display unit as compared with when determining that the operation state is a contact state.

8 Claims, 8 Drawing Sheets (51) Int. Cl.
  *G06F 3/0488* (2013.01)
  *G06F 3/0482* (2013.01)
  *G01C 21/26* (2006.01)

(52) U.S. Cl.
  CPC .......... *G06F 3/0482* (2013.01); *G06F 3/0488* (2013.01); *G06F 3/04883* (2013.01); *G06F 2203/04108* (2013.01)

(56) References Cited

U.S. PATENT DOCUMENTS

| | | |
|---|---|---|
| 2012/0050501 A1 | 3/2012 | Narita |
| 2012/0092251 A1* | 4/2012 | Hashimoto ............ B60K 35/00 345/156 |
| 2013/0181897 A1 | 7/2013 | Izumi |
| 2015/0205943 A1 | 7/2015 | Takenaka et al. |

FOREIGN PATENT DOCUMENTS

| | | | |
|---|---|---|---|
| JP | 2010102516 A | 5/2010 | |
| JP | 2011118857 A | 6/2011 | |
| JP | 2011162132 A | 8/2011 | |
| JP | 2012048622 A | 3/2012 | |
| JP | 2013016060 A | 1/2013 | |
| WO | WO-2014030352 A1 | 2/2014 | |
| WO | WO-2014162698 A1 | 10/2014 | |
| WO | WO-2014162699 A1 | 10/2014 | |

\* cited by examiner

|      | SENSING TH (COUNT) | OPERATION STATE | SCREEN |
|------|--------------------|-----------------|--------|
| Hth1 | 200                | CONTACT         | CONTACT |
| Hth2 | 175                | PROXIMITY 1     | PROXIMITY 1 |
| Hth3 | 150                | PROXIMITY 2     | PROXIMITY 2 |
| Hth4 | 125                | PROXIMITY 3     | PROXIMITY 3 |
| Hth5 | 100                | NON-CONTACT     | NON-CONTACT |

| STATE | NON-CONTACT | PROXIMITY | CONTACT |
|---|---|---|---|
| SCREEN | DISPLAY OPERATING STATE ORIGINAL SHARPNESS | SHARPNESS VARIABLE WITH PROXIMITY LEVEL ONLY MENU IS CLEAR, AND PROXIMITY OPERATION CAN CHANGE MENU (ASSUMED OPERATION) FINGER FAR: SHARPNESS LOW / FINGER NEAR: SHARPNESS HIGH | DISPLAY OPERATING STATE ORIGINAL SHARPNESS → ENABLE SCREEN OPERATION |
| OPERATION | SENSITIVITY = 0–100 NO OPERATION | SENSITIVITY = 101–200 GESTURE SUCH AS FLICK IN PROXIMITY AREA CAN CHANGE MENU | SENSITIVITY = 200– TOUCH OPERATION CAN SELECT ICON |

FIG. 8

■ SCREEN TRANSITION (EXAMPLE OF MENU CHANGE IN PROXIMITY OPERATION)

<MENU SCREEN CHANGE>

- CLEAR MENU
- PROXIMITY SCREEN (BLURRED) WITH RECOGNIZABLE IMAGE

<FLICK OPERATION IN PROXIMITY>

| STATE | PROXIMITY | CONTACT |
|---|---|---|
| SCREEN | MENU CHANGE BY MIDAIR OPERATION<br>···MENU CHANGE BY MIDAIR OPERATION IS RECOGNIZABLE | MENU CHANGE BY TOUCH OPERATION<br>···MENU CHANGE BY TOUCH OPERATION IS RECOGNIZABLE |
| OPER-ATION | SENSITIVITY = 101–200 MENU CHANGE BY GESTURE SUCH AS FLICK IN PROXIMITY AREA | SENSITIVITY = 200– (TOUCHING) |

INPUT DEVICE

CROSS REFERENCE TO RELATED APPLICATIONS

This application is a U.S. National Phase Application under 35 U.S.C. 371 of International Application No. PCT/JP2014/001775 filed on Mar. 27, 2014 and published in Japanese as WO 2014/162697 A1 on Oct. 9, 2014. This application is based on and claims the benefit of priority from Japanese Patent Application No. 2013-077248 filed on Apr. 2, 2013 and Japanese Patent Application No. 2014-014760 filed on Jan. 29, 2014. The entire disclosures of all of the above applications are incorporated herein by reference.

TECHNICAL FIELD

The present disclosure relates to an input device for inputting an operator's finger operation for an information display in a display unit

BACKGROUND ART

For example Patent Literature 1 discloses a conventional input device. The input device (an operational user-interface device) disclosed by Patent Literature 1 includes a remote touchpad unit for a user to perform a touch operation, a display unit to display a multimedia system of various modes according to three-dimensional signals received from the remote touchpad unit, and a controller to control the operation of the multimedia system according to the three-dimensional signals of the remote touchpad unit.

In the input device disclosed by Patent Literature 1, when the position of a user's finger is located in a range of a first height from the surface of the remote touchpad unit, the position of the finger (pointer) is displayed on the display unit to enable a detailed operation through the movement of the pointer and the changeover of a menu.

When the position of the user's finger is located in the range from the first height to a second height, switching between a first mode and a second mode is enabled by a wipe pass gesture, and movement among a home, a main, and a sub screen is also enabled.

When the position of the user's finger is located in the range from the second height to a third height, switching to an operation standby screen is enabled in a radio main screen.

Furthermore, in Patent Literature 1, an illumination part is provided in a remote touchpad unit or a display unit for example. When a finger is in a height exceeding 7 cm from the surface of the remote touchpad unit, the illumination part is displayed in the state turned off. As the finger approaches the remote touchpad unit, the hue of the illumination part becomes deep gradually. When the finger is in contact with the remote touchpad unit, the illumination part is displayed by a hue different from the above-described hue. Accordingly, it is possible for a user to recognize easily how the finger has approached the remote touchpad unit.

PRIOR ART LITERATURES

Patent Literature

Patent Literature 1: JP-2011-118857 A

SUMMARY OF INVENTION

According to studies by the inventor of the present application, however, because Patent Literature 1 provides the illumination part separately from the display unit in order to enable the user to recognize how the finger has approached the remote touchpad unit by watching the illumination part, the user is required to pay attention to the illumination part, making it difficult for the user to concentrate on an image displayed on the original display unit.

In view of the foregoing, it is an object of the present disclosure to provide an input device that enables an intuitive understanding of a finger position relative to an operation surface and that enables easy determination of an operation manner to an image, without requiring excessive attention to other than the image displayed.

In order to achieve the above object, the input device according to an example of the present disclosure adopts the following configurations.

An input device is separated from a display unit that switchably displays images hierarchized in a plurality of hierarchy levels and configured to input a finger operation of a user to an operation surface to operate the images. The input device comprises a detector that detects an operation state of the finger to the operation surface at a time of the finger operation and a controller that, when determining that the operation state detected by the detector is a proximity state, reduces sharpness of at least part of the image displayed on the display unit as compared with when determining that the operation state detected by the detector is a contact state. The contact state is a state in which the finger is in contact with the operation surface and the proximity state is a state in which the finger is proximity to the operation surface.

According to the above input device, when a user's finger is in the proximity state in operating an image, the controller reduces the sharpness of at least part of the image compared with the sharpness in the contact state. Therefore, the user can understand intuitively that the finger does not reach to the operation surface yet and is not in the state in which an operation can be performed by touching the operation surface. When the finger is in the contact state in contrast to the proximity state, the image is displayed with the original sharpness which is convenient in performing the finger operation. Therefore, the user can understand easily the proximity state or the contact state of the finger relative to the operation surface, according to the sharpness of the image. Therefore, it is possible to easily determine the operation point to the image, without requiring excessive attention to other than the image displayed; accordingly the operation becomes definitely clear.

EMBODIMENTS FOR CARRYING OUT INVENTION

Hereinafter, embodiments of the present disclosure are described based on drawings. In the following embodiments, like references are used to refer to corresponding elements and redundant description may be omitted. When a part of the configuration is description in an embodiment, the configuration of other embodiments previously described can be applied to other parts of the configuration concerned. Combinations of configurations are not limited to those explicitly described in respective embodiments. Other combinations, even if not explicitly illustrated, can be obtained by partially combining multiple embodiments as long as the combination does not cause impediments in particular.

(First Embodiment)

A first embodiment (FIG. 1 to FIG. 8) applies the input device of the present disclosure to a remote operation device 100 used to operate a navigation device 50. The remote operation device 100 is mounted in a vehicle, and constitutes a display system 10 in cooperation with the navigation device 50.

Figure 1:
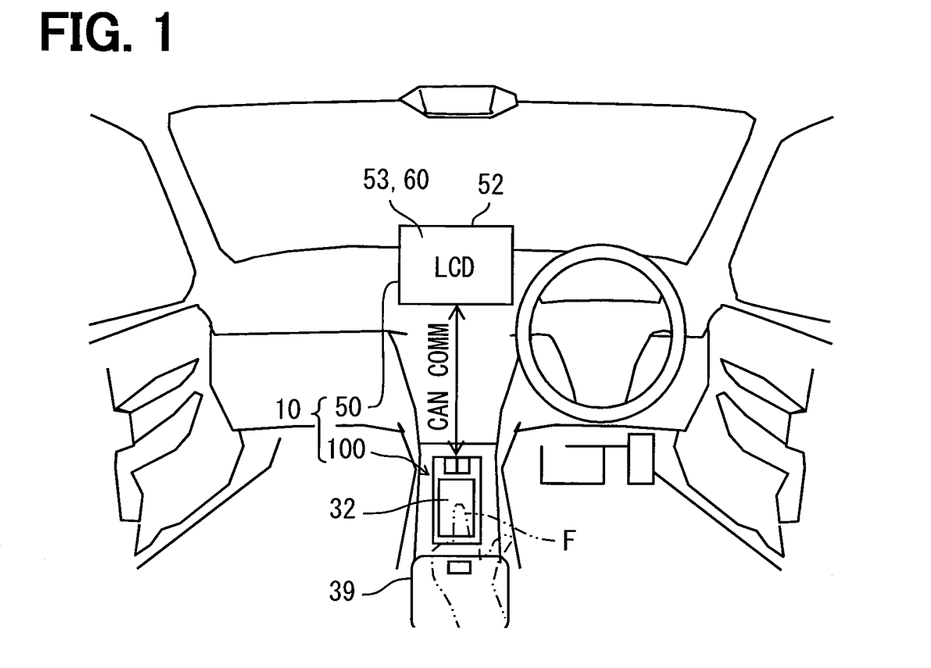
FIG. 1 is a drawing illustrating an arrangement of a navigation device and a remote operation device.
Figure 2:
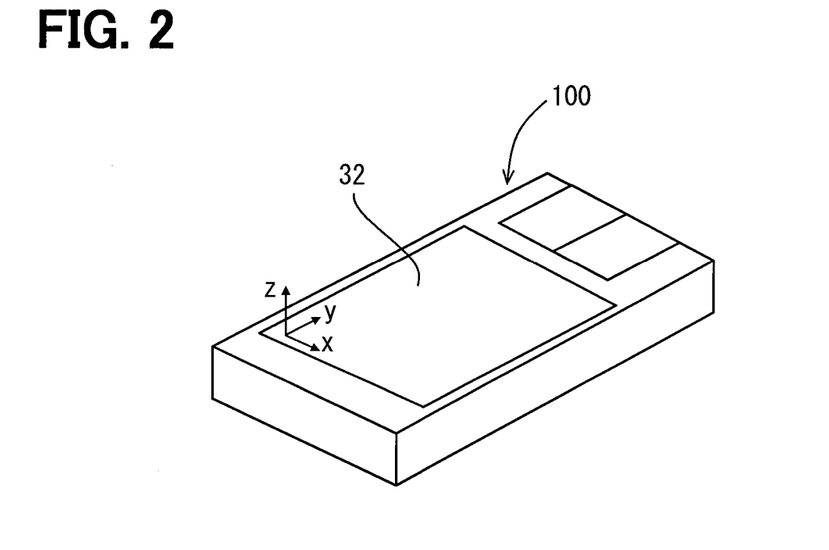
FIG. 2 is a perspective view illustrating the remote operation device.

As illustrated in FIG. 1 and FIG. 2, the remote operation device 100 is installed in the position adjoining a palm rest 39 in a center console of the vehicle and exposes its operation surface 32 within the easy reach of an operator (a user). The remote operation device 100 includes a touch sensor 31. The surface of the touch sensor 31 provides the above-described operation surface 32 to which an operator's finger operation is performed. F in FIG. 1 refers to the operator's finger.

The navigation device 50 is installed in an instrument panel of the vehicle so that a display screen 53 of a liquid crystal display 52 is exposed and oriented to the driver's seat so as to be viewable from an operator. The display system 10 (the liquid crystal display 52) switches and displays various display images 60 on the display screen 53. The above-described remote operation device 100 is provided separately from the navigation device 50, and is installed at a position away from the navigation device 50. The liquid crystal display corresponds to an example of a display unit of the present disclosure.

Figure 3:
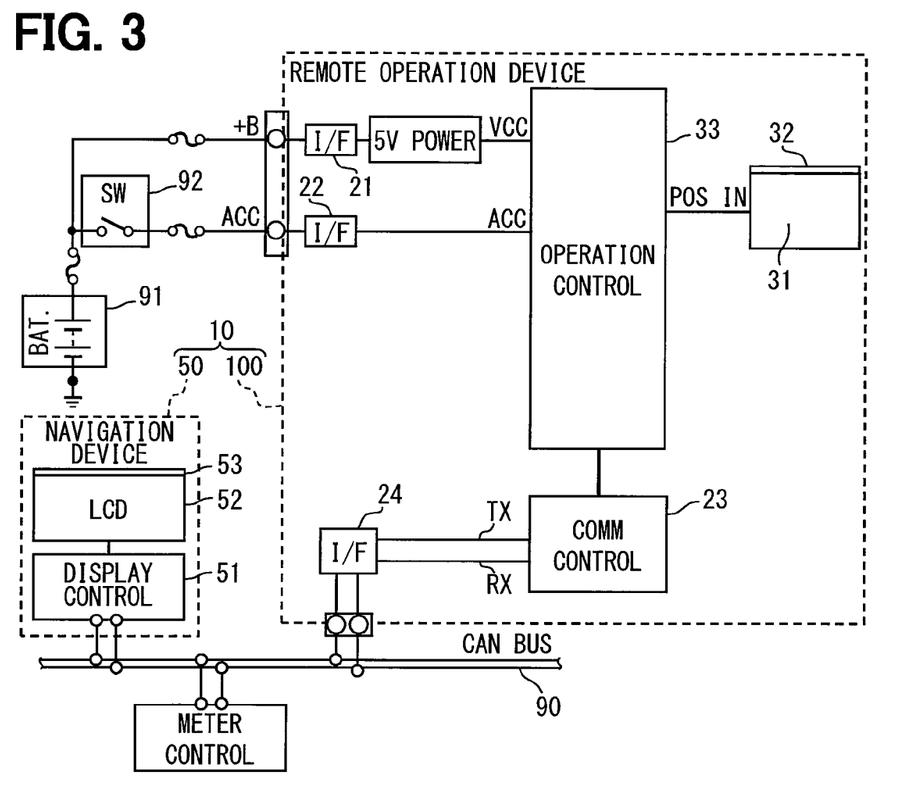
FIG. 3 is a diagram illustrating a configuration of the navigation device and the remote operation device according to a first embodiment.

Hereinafter, the configurations of the remote operation device 100 and the navigation device 50 are explained in detail with reference to FIG. 3.

The remote operation device 100 is coupled to a controller area network bus (hereinafter called a CAN bus (registered trademark)) 90, an external battery 91 and the like. In an in-vehicle communication network connecting in-vehicle devices mounted in the vehicle, the CAN bus 90 is a transmission line employed for transmission of data among the in-vehicle devices. The remote operation device 100 can communicate with the navigation device 50 which is separately located, via the CAN bus 90.

The remote operation device 100 includes power source interfaces 21 and 22, a communication control unit 23, a communication interface 24, a touch sensor 31, an operation surface 32, and an operation control unit 33. The power source interfaces 21 and 22 stabilize a power supplied from the battery 91, and supply it to the operation control unit 33. The power is always supplied from the battery 91 to one of the power source interfaces, which is the power source interface 21. When an accessories (ACC) power of the vehicle is turned on and a switch 92 is accordingly set in a conductive state, the power is supplied from the battery 91 to the other of the power source interfaces, which is the power source interface 22.

The communication control unit 23 and the communication interface 24 output the information that is processed by the operation control unit 33 to the CAN bus 90. The communication control unit 23 and the communication interface 24 acquire the information that is outputted from other in-vehicle devices to the CAN bus 90. The communication control unit 23 and the communication interface 24 are coupled to each other with a transmission signal line TX and a reception signal line RX.

The touch sensor 31 is a capacitive-type detector (an example of detection means). The touch sensor 31 has a rectangular plate shape and detects a state of finger operation to a sensor surface. In the touch sensor 31, electrodes are arranged in an x-axis direction and a y-axis direction to form a lattice. These electrodes are coupled to the operation control unit 33.

Capacitance generated in each electrode changes depending on the position ((x, y, z)-coordinates of FIG. 2) of a finger approaching the sensor surface. A signal of the generated capacitance (sensitivity value) is outputted to the operation control unit 33. The sensor surface is covered with an insulation sheet made of an insulation material.

The operation surface 32 is a plane part over which an operator performs a finger operation. For example, the whole insulation sheet of the sensor surface 32 is applied with a material which helps a smooth sliding of a finger. The input for the operation to a display image 60 (refer to FIG. 7) displayed on the display screen 53 can be made by the finger operation of the operator in the x-axis direction, the y-axis direction, or the z-axis direction over the operation surface 32.

The operation control unit 33 corresponds to an example of a controller of the present disclosure. The operation control unit 33 includes a processor which performs various kinds of processing, a RAM which functions as workspace of the processing, and a flash memory which stores the program for the processing. In addition, the operation control unit 33 is coupled to the power source interfaces 21 and 22, the communication control unit 23, and the touch sensor 31.

By running a specified program, the operation control unit 33 measures the capacitance signal of each electrode of the touch sensor 31 to acquire the sensitivity value (Hth), which is a measurement value of the touch sensor 31. When an operator's finger approaches the operation surface 32 (the sensor surface), a charge is stored between the electrode and the finger. The operation control unit 33 calculates the x coordinate, the y coordinate, and the z coordinate by the calculation processing based on the sensitivity value. The x coordinate and the y coordinate indicate the relative operation position of the finger in the direction in which the operation surface 32 spreads (hereinafter called relative position), and the z coordinate corresponds to the distance from the operation surface 32 to the finger (hereinafter called an operation distance).

Figure 4:
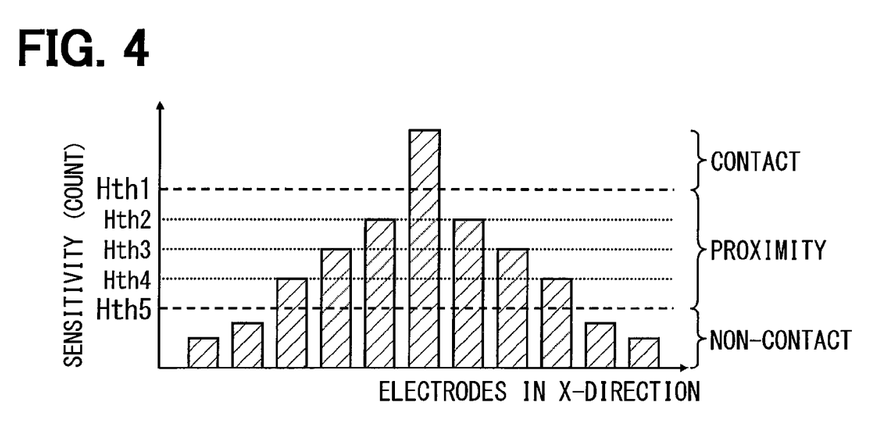
FIG. 4 is a drawing illustrating a relation between a sensitivity value detected by a touch sensor and an operation state determined by an operation control unit in the remote operation device according to the first embodiment.

Specifically, as shown in FIG. 4 for example, when a finger is placed in contact with the operation surface 32 at a position corresponding to the position of a certain electrode among the electrodes aligned in the x-axis direction, a large sensitivity value is acquired from the certain electrode. The sensitivity value acquired from an electrode distant from the finger contact position is smaller because the contact state of the finger is lost for the distant electrode. The similar characteristics are also obtained in the electrodes aligned in the y-axis direction. Therefore, the operation control unit 33 calculates the present relative position of the finger from the point (x-coordinate position, y-coordinate position) corresponding the electrode at which the biggest sensitivity value is acquired among the electrodes in the x-axis direction and the y-axis direction.

In the z-axis direction, the sensitivity value becomes larger as the finger approaches closer the operation surface 32, and the sensitivity value becomes smaller as the finger recedes further from the operation surface 32. Therefore, the operation control unit 33 calculates the z-coordinate position of the present finger, that is, the operation distance, based on the magnitude of the sensitivity value acquired.

Figure 5:
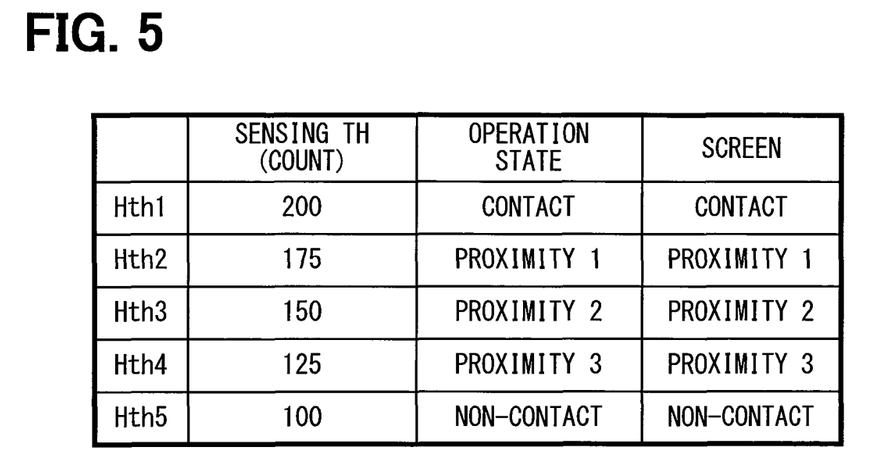
FIG. 5 is a drawing illustrating a relation among a sensitivity threshold, an operation state and a screen display, stored in the operation control unit according to the first embodiment.

The operation control unit 33 associates the operation state of a finger (the operation distance of the finger in the z-axis direction) with the acquired sensitivity value, as shown in FIG. 4 and FIG. 5, and associates the below-described operation action to the display image 60 with the acquired sensitivity value. Sensitivity thresholds Hth1 to Hth5 for determining the operation state are preset in the operation control unit 33. The operation control unit 33 determines the operation state of a finger according to the sensitivity threshold. The operation state is classified into the contact state in which the finger is in contact with the operation surface 32 or the finger is out of contact actually but almost in contact, the proximity state in which the finger is close to the operation surface 32, and the noncontact state in which the finger is placed further away from the operation surface 32 than in the proximity state. The contact state may be an operation state in which a finger is substantially in contact with the operation surface 32.

For example, the sensitivity thresholds provided in the operation control unit 33 are Hht1=200 counts, Hht2=175 counts, Hht3=150 counts, Hht4=125 counts, and Hht5=100 counts. Then, when the sensitivity value is greater than Hth1 (200), the operation control unit 33 determines that the finger is in the contact state to the operation surface 32. When the sensitivity value is between Hth1 and Hth5 (200 to 101), the operation control unit 33 determines that the finger is in the proximity state to the operation surface 32. When the sensitivity value is equal to or smaller than Hth5 (100), the operation control unit 33 determines that the finger is in the noncontact state to the operation surface 32. Hereinafter, the contact state may be simply called as contact, the proximity state as proximity, and the noncontact state as noncontact.

The operation control unit 33 determines the proximity state in terms of several divided proximity states of proximity 1 to proximity 3. The proximity 1 corresponds to the sensitivity value equal to or greater than Hth2 (175). The proximity 2 corresponds to the sensitivity value equal to or greater than Hth3 (150). The proximity 3 corresponds to the sensitivity value equal to or greater than Hth4 (125).

When a finger moves up and down delicately around each of the sensitivity thresholds Hth1 to Hth5, a reversal repetition (hunching) takes place in the determination result of the operation state by the operation control unit 33. Therefore, in the upper side of each of the sensitivity thresholds Hth1 to Hth5 (the near side of the operation surface 32), upper thresholds Hth1U to Hth5U corresponding to the positions distant by a predetermined distance are set up, respectively. In the lower side of each of the sensitivity thresholds Hth1 to Hth5 (the far side of the operation surface 32), lower thresholds Hth1D to Hth5D corresponding to the positions distant by a predetermined distance are set up, respectively. When a finger is moved from the lower side (far side) of each of the sensitivity thresholds Hth1 to Hth5 towards the upper side (near side), the upper thresholds Hth1U to Hth5U serve as a sensitivity threshold in determining the operation state. On the contrary, when a finger is moved from the upper side (near side) of each of the sensitivity thresholds Hth1 to Hth5 towards the lower side (far side), the lower thresholds Hth1D to Hth5D serve as a sensitivity threshold in determining the operation state.

The operation control unit 33 outputs the instructions to change the sharpness of the display image 60 according to the operation state (contact, proximity, and noncontact) of a finger, to the below-described display control unit 51 via the CAN bus 90 (the details will be described later). Here, the sharpness of the display image 60 indicates the degree of appearance that the display image 60 looks vivid and clear. The state of a high sharpness is the state where the display image 60 is displayed clearly. On the contrary, the state of a low sharpness is the state where the display image 60 is displayed blurred. IN the high sharpness, the readability or legibility of the display image 60 is enhanced for an operator. On the contrary, in the low sharpness, the readability or legibility of the display image 60 is poor for an operator.

The operation control unit 33 detects a pressing operation (touch operation) when an operator presses down the operation surface 32 lightly with a finger. Then, the operation control unit 33 outputs the occurrence or non-occurrence of the pressing operation and the (x, y, z)-coordinates indicative of the position of the finger accompanying the slide operation of a finger to the CAN bus 90 via the communication control unit 23 and the communication interface 24.

The navigation device 50 includes an air-conditioning operation setup function to a vehicle air conditioner, an audio operation setting up function to a vehicle audio, and a search and browse function for variety of information by the Internet in addition to a navigation function which performs display of the current position on a map and guidance to a destination. The navigation device 50 is coupled to the CAN bus 90 to communicate with the remote operation device 100. The navigation device 50 includes a display control unit 51 and a liquid crystal display 52.

The above-described various functions of the navigation device 50 are indicated in menu items 61 in a display image 60 of the liquid crystal display 52 as Climate (air conditioner operation), Map (map display), Destination (destination setting), Media (audio operation), and Network (Internet operation) (refer to FIG. 7 and FIG. 8), which will be described later.

The display control unit 51 includes a processor which performs various kinds of processing, a RAM which functions as workspace of the processing, a graphic processor which performs image drawing, and a graphic RAM which functions as workspace for drawing. The display control unit 51 further includes a flash memory which stores data for the processing and the drawing, a communication interface coupled to the CAN bus 90, and a video output interface which outputs the drawn image data to the liquid crystal display 52. The display control unit 51 draws the display image 60 displayed on the display screen 53 based on the information acquired from the CAN bus 90. Then, the display control unit 51 sequentially outputs the image data of the drawn display image 60 to the liquid crystal display 52 via the video output interface.

Upon receiving instructions to change the sharpness from the operation control unit 33 via the CAN bus 90, the display control unit 51 changes the sharpness of the display image 60 (the details will be described later). In an example of sharpness change manner, the display images 60 with different degrees of sharpness, that is, blurred images (for example, in three levels) to the clear image, are prepared in advance, and one of the images is selected according to the operation state (contact, proximity, and noncontact) of a finger. In another manner, the luminance of the display image 60 is changed to make the display image 60 blurred. In yet another manner, the display image 60 is displayed in mosaic to reduce the sharpness of the display image 60.

The liquid crystal display 52 is a display unit of the dot matrix system which realizes color display by controlling multiple pixels arranged on a display screen 53. The liquid crystal display 52 displays an image by writing continuously the image data acquired from the display control unit 51 successively, on the display screen 53.

Figure 7:
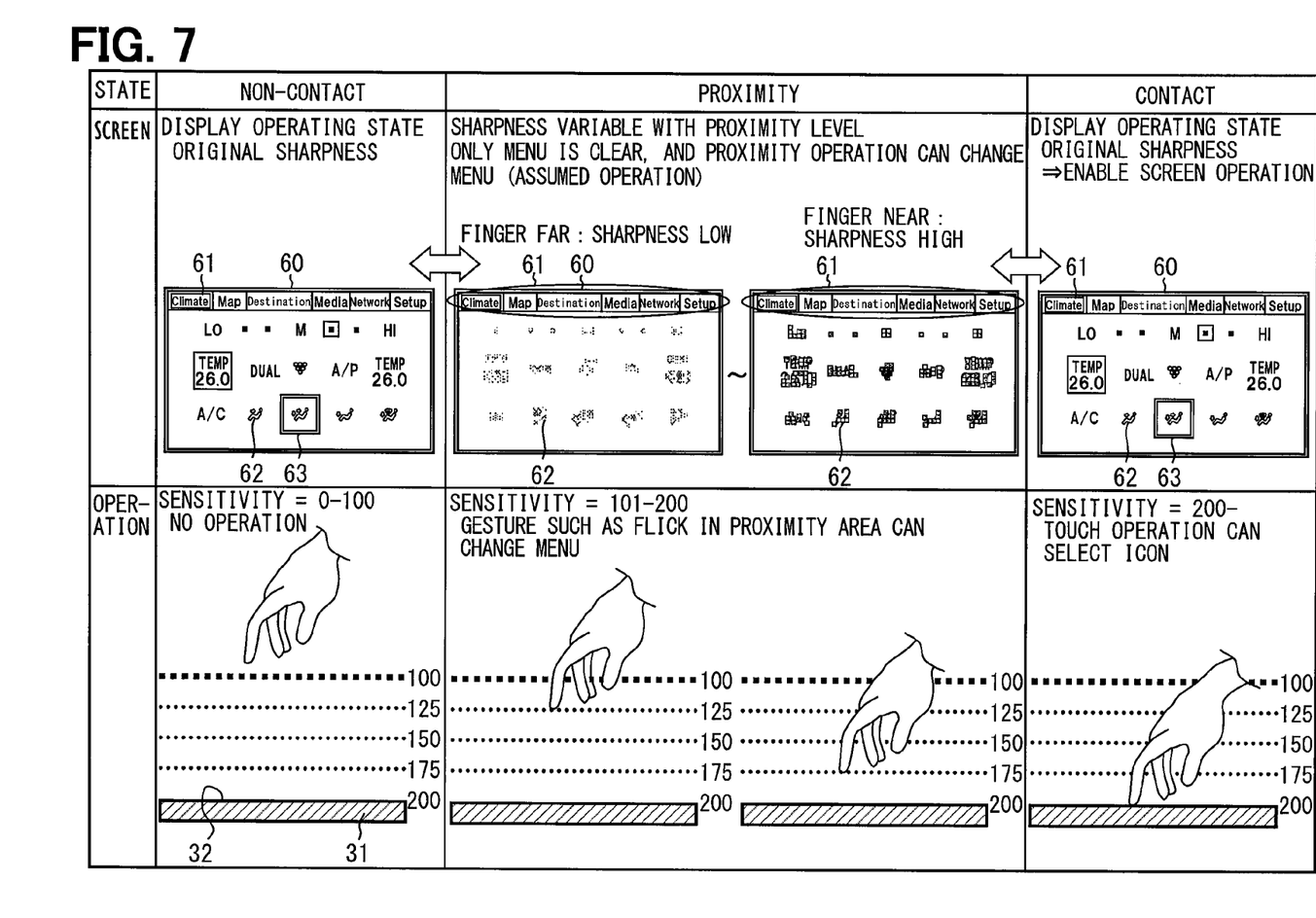
FIG. 7 is a drawing illustrating an input operation and a change in image associated with movement of a finger as a function of an operation distance from the touch sensor to the finger in the remote operation device according to the first embodiment.

The display image 60 displayed on the display screen 53 corresponds to an example of image of the present disclosure. The display image 60 is provided by images hierarchized in multiple hierarchy levels. For example, images of the first hierarchy level (specified hierarchy level) among images of multiple hierarchy levels are multiple main images for the various functions (the navigation, the air-conditioner, the audio, the Internet, etc.) of the navigation device 50. For example, as one main image, FIG. 7 illustrates the main image for the air-conditioner.

In the upper part of the display image 60, a menu 61 is displayed. The menu 61 has horizontally-aligned menu items that indicate the classifications (names) of the multiple main images. The menu 61 is always displayed in the same form even when the display image 60 is switched to an image of any hierarchy level. When an operator selects a desired item in the menu 61 by a finger operation over the operation surface 32, the corresponding main image is displayed on the display screen 53. Alternatively, when an arbitrary main image is displayed, the operator can scroll the main images sequentially to display a desired main image by performing a slide operation of a finger over the operation surface 32 instead of operating the menu 61.

Multiple icons 62 for operating the image are provided in each main image. The example of FIG. 7 illustrates a wind amount setting icon, a temperature setting icon, a dual setting icon, and a blow off mode setting icon for the air conditioner operation. When an operator selects a desired icon 62 by performing the slide operation of a finger over the operation surface 32, a frame-shaped focus 63 is displayed indicating that the icon 62 has been selected. Furthermore, when the finger is lightly pressed down (when a touch operation is performed) over the operation surface 32 corresponding to the position of the selected icon 62, the icon 62 is set into a determination state, and the display shifts to an image of the second hierarchy, that is, an image for the operation corresponding to the determined icon, thereby allowing the use of the various functions sequentially.

Next, explanation will be given on details of the input process from the touch sensor 31 by the operation control unit 33, with reference to FIG. 6 to FIG. 8. Based on the input process of the operation control unit 33, the display control unit 51 adjusts the display image 60.

Figure 6:
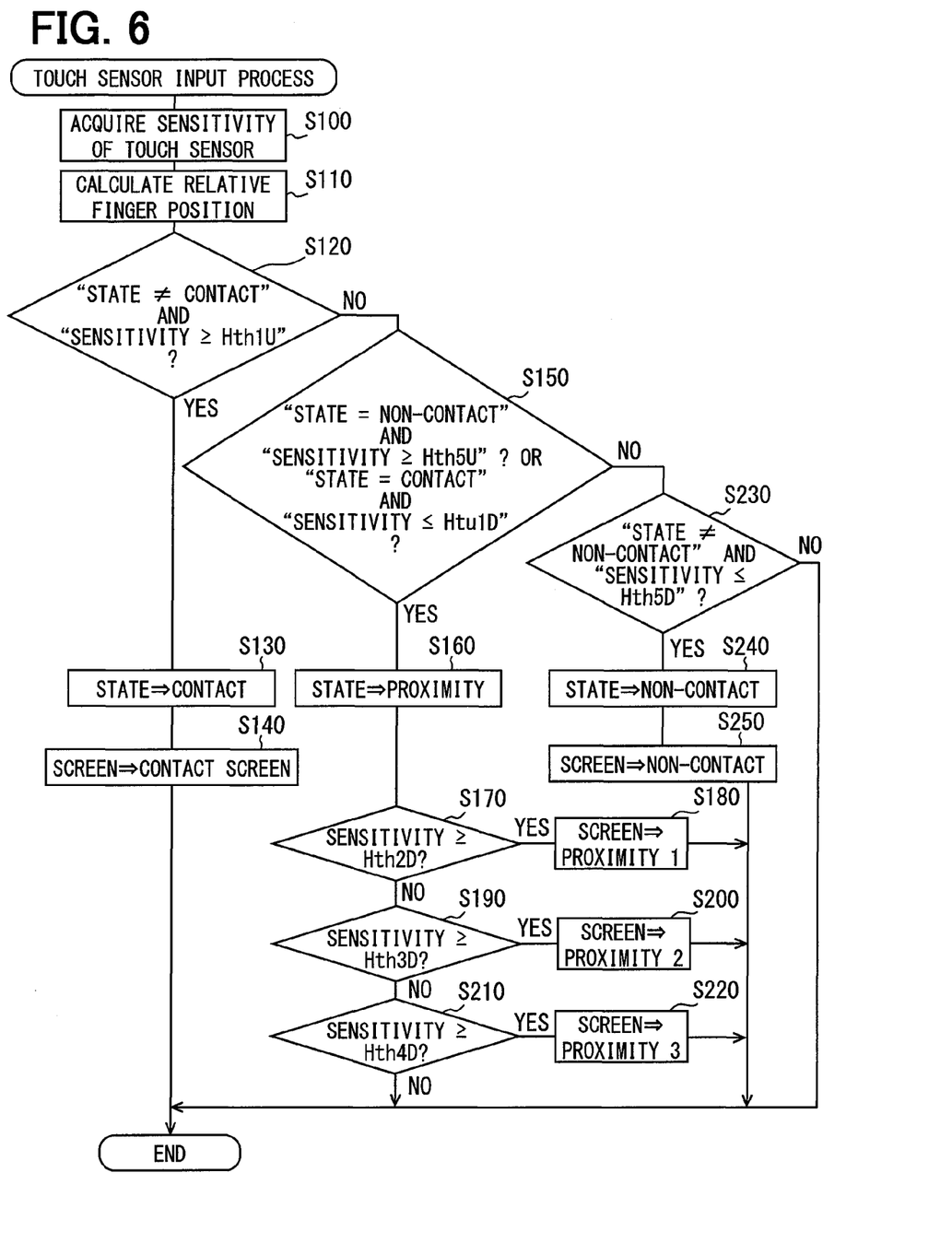
FIG. 6 is a flow chart illustrating an input process performed by the operation control unit in the remote operation device according to the first embodiment.

As illustrated in FIG. 6, at first, at S100, the operation control unit 33 performs acquisition processing to acquire the sensitivity value detected by the electrodes of the touch sensor 31, and the flow advances to S110. At S110, the operation control unit 33 performs computation of the x-coordinate and the y-coordinate which indicate the relative position of the finger to the operation surface 32, and the z-coordinate which indicates the operation distance, from the sensitivity value acquired at S100. Then, from the calculated value of the z-coordinate which indicates the operation distance, the operation control unit 33 calculates whether the operation state of the finger is contact, proximity, or noncontact.

Specifically, the operation control unit 33 determines the state as contact when the sensitivity value detected by the touch sensor 31 is greater than Hth1 (Hth1U), as proximity when the sensitivity value is between Hth5 (Hth5U) and Hth1 (Hth1D), and as noncontact when the sensitivity value is smaller than Hth5 (Hth5D).

Then, at S120, the operation control unit 33 determines whether or not both the calculated operation state of the finger is other than contact and the sensitivity value is equal to or greater than Hth1 (specifically, equal to or greater than the upper threshold Hth1U). When affirmative determination is made here, it is recognized that the operator's finger approaches the operation surface 32 from the state of noncontact or proximity, and goes in the state of contact to the operation surface 32; accordingly, at S130, the operation control unit 33 updates the operation state of the finger to contact.

Then, at S140, the display control unit 51 updates the display screen 53 to a contact screen. The contact screen is a screen in which the display image 60 is displayed with the original sharpness, as illustrated in FIG. 7 (in the right-hand side frame). That is, in the contact screen, the menu 61, various icons 62, and the focus 63 are displayed clearly. The focus 63 indicates the current operating state (operation setup state) of the device corresponding to the main image displayed.

In the contact screen, an operator can perform an original screen operation, that is, the selection and confirmation of the menu 61 and various icons 62, by the finger operation (such as a sliding operation and a touch operation). At this time, based on the sharpness of the display image 60, the operator can know intuitively that the operation state of the finger is contact and that the finger operation to each menu 61 and various icons 62 is possible.

When negative determination is made at S120, the operation control unit 33 determines at S150 whether or not either first or second condition is satisfied. The first condition is that the operation state is noncontact and the sensitivity value is equal to or greater than Hth5 (specifically equal to or greater than the upper threshold Hth5U). The second condition is that the operation state is contact and the sensitivity value is equal to or smaller than Hth1 (specifically equal to or smaller than the lower threshold Hth1D). When affirmative determination is made here, it is recognized that the operator's finger approaches the operation surface 32 from the state of noncontact, or the operator's finger recedes somewhat from the state of contact to the operation surface 32; accordingly, at S160, the operation control unit 33 updates the operation state of the finger to proximity.

At S170, the operation control unit 33 determines whether the sensitivity value is equal to or greater than Hth2 (specifically equal to or greater than the lower threshold Hth2D). When affirmative determination is made here, it is recognized that the operation state of a finger is proximity and the finger is in a nearer state to the operation surface 32 (proximity 1); accordingly, at S180, the display control unit 51 updates the display screen 53 to a proximity 1 screen. The proximity 1 screen is a screen where the display image 60 is displayed with somewhat reduced sharpness compared with the original sharpness, as illustrated in FIG. 7 (right-hand side of the middle frame). In the proximity 1 screen, at least part of the display image 60 (here various icons 62) is displayed with a somewhat reduced sharpness compared with the contact screen. In the proximity 1 screen, the focus 63 in the display image 60 is not displayed. The menu 61 is displayed with the original sharpness maintained, as is the case with the contact screen in the present embodiment.

When negative determination is made at S170, the operation control unit 33 determines whether the sensitivity value is equal to or greater than Hth3 (specifically, equal to or greater than the lower threshold Hth3D) at S190. When affirmative determination is made here, it is recognized that the operation state of the finger is the proximity and the finger is receded somewhat from the operation surface 32 (proximity 2). At S200, the display control unit 51 updates the display screen 53 to the proximity 2 screen. The proximity 2 screen is a screen in which the sharpness of the icon 62 in the display image 60 is displayed in a somewhat lower level than the sharpness of the icon 62 in the proximity 1 screen. In the proximity 2 screen, the focus 63 in the display image 60 is not displayed. The menu 61 is displayed with the original sharpness maintained, as is the case with the contact screen in the present embodiment.

When negative determination is made at S190, the operation control unit 33 determines whether the sensitivity value is equal to or greater than Hth4 (specifically, equal to or greater than the lower threshold Hth4D) at S210. When affirmative determination is made here, it is recognized that the operation state of the finger is the proximity and the finger is receded considerably from the operation surface 32 (proximity 3). At S220, the display control unit 51 updates the display screen 53 to a proximity 3 screen. The proximity 3 screen is a screen where the sharpness of the icon 62 in the display image 60 is reduced to some extent, compared with the sharpness of the icon 62 in the proximity 2 screen, as illustrated in FIG. 7 (left-hand side of the middle frame). In the proximity 3 screen, the focus 63 in the display image 60 is not displayed. The menu 61 is displayed with the original sharpness maintained, as is the case with the contact screen in the present embodiment. At S210, when negative determination is made, the present flow is terminated.

Figure 8:
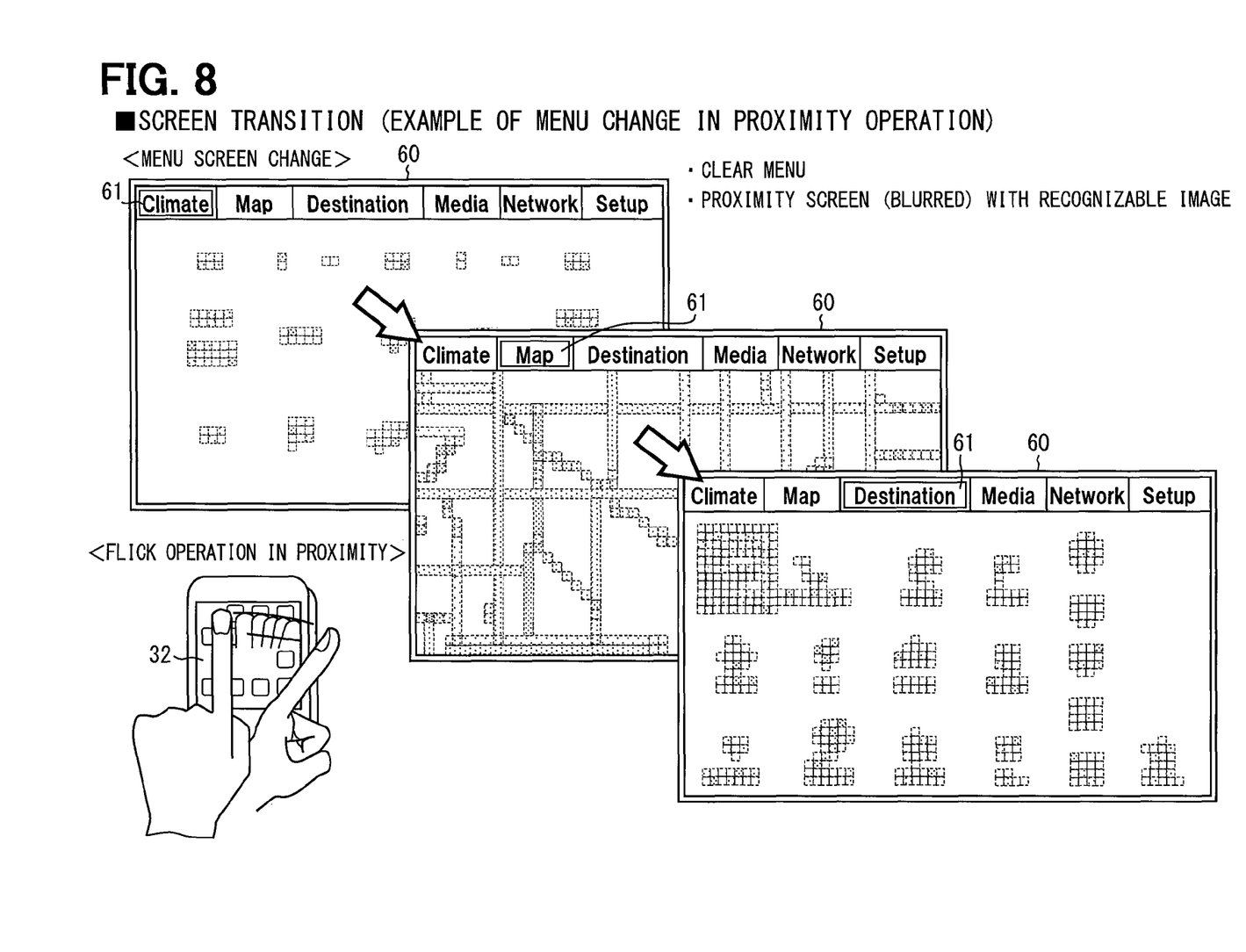
FIG. 8 is an explanatory drawing illustrating a finger operation made during a proximity operation and a change of a screen in the first embodiment.

In the proximity 1 screen, the proximity 2 screen, and the proximity 3 screen, it is possible for the operator to change the main image by use of the menu 61 by the finger operation (a gesture such as a flick) in the proximity, as illustrated in FIG. 8. At this time, based on the sharpness of the display image 60, the operator can know intuitively that the position of the finger is in the proximity (proximity 1 to proximity 3), that it is possible to perform the finger operation to the menu 61 of which the original sharpness is maintained, and that it is not possible to perform the finger operation to various icons 62 of which the sharpness is reduced. In addition, the operator can know intuitively that the finger is in the position approaching the operation surface 32 (on the side of proximity 1) with increasing sharpness of the display image 60, and that the finger is conversely in the position receding from the operation surface 32 (on the side of proximity 3) with decreasing sharpness.

When negative determination is made at S150, the operation control unit 33 determines at S230 whether or not both the operation state is other than noncontact and the sensitivity value is equal to or smaller than Hth5 (specifically equal to or smaller than the lower threshold Hth5D). When affirmative determination is made here, it is recognized that the operator's finger recedes greatly from the operation surface 32 from the state of contact or proximity; accordingly, at S240, the operation control unit 33 updates the operation state of the finger to noncontact. At S230, when negative determination is made, the present flow is terminated.

At S250, the display control unit 51 updates the display screen 53 to a noncontact screen. The noncontact screen is a screen in which the display image 60 is displayed with the original sharpness, as illustrated in FIG. 7 (in the left-hand side frame). That is, in the noncontact screen, the menu 61, the various icons 62, and the focus 63 are displayed clearly as is the case with the contact screen. The focus 63 indicates the current operating state (operation setup state) of the device corresponding to the main image displayed.

On the noncontact screen, the operator's finger is in the state of being separated clearly from the operation surface 32, and the operator can see the display image 60 simply as a confirmation screen to confirm the current operating state of the device without the intention to operate the display image 60.

As explained above, in the present embodiment, when an operator's finger is in the proximity state in operating the display image 60, the operation control unit 33 reduces the sharpness of at least part (the icon 62 in the present case) of the display image 60 compared with the sharpness in the contact state. Therefore, the operator can understand intuitively that the finger does not reach the operation surface 32 yet and is not in the state in which an operation can be performed by touching the operation surface 32. When the finger is in the contact state in contrast to the proximity state, the display image 60 is displayed with the original sharpness which is convenient in performing the finger operation. Therefore, the operator can understand easily the proximity state or the contact state of the finger to the operation surface 32, according to the sharpness of the display image 60. Therefore, it is possible to easily determine the operation point to the display image 60, without requiring excessive attention to pay to other than the display image 60; accordingly the operation becomes definitely clear.

The operation control unit 33 reduces the sharpness of the image more greatly, with increasing distance of the finger from the operation surface 32 in the proximity state. That is, the sharpness of the image changes such that the contact screen (basic sharpness)>the proximity 1 screen>the proximity 2 screen>the proximity 3 screen. Accordingly, about the position of the finger in the proximity state, it is possible for the operator to understand more clearly the magnitude of the distance of the finger from the operation surface 32, by the sharpness of the display image 60.

In the present embodiment, the icon 62 is selected as the at least part of the image (target image) of which the sharpness is reduced in the display image 60. Accordingly, by looking the sharpness of the icon 62 on the display image 60 to be operated, the operator can understand clearly where the current position of the finger is on the operation surface 32 and which operation is possible.

When reducing the sharpness of the at least part (the icon 62) of the display image 60, the operation control unit 33 maintains the original sharpness of the menu item 61. Accordingly, the menu item 61 is always displayed clearly. Therefore, it is possible to perform the selection and change-over operation of the menu item 61 to look at, irrespective of the operation state of the finger.

When the operation state detected is in the noncontact state receding from the proximity state to the operation surface 32, the operation control unit 33 maintains the sharpness of the display image 60 displayed on the liquid crystal display 52 at the original sharpness. The operation state in the noncontact state is a case where the operator does not perform the finger operation substantially. In such a case, the sharpness of the display image 60 is maintained at the original sharpness; therefore, the operator can look at the display image 60, without feeling inconvenience at all.

(Second Embodiment)

Figure 9:
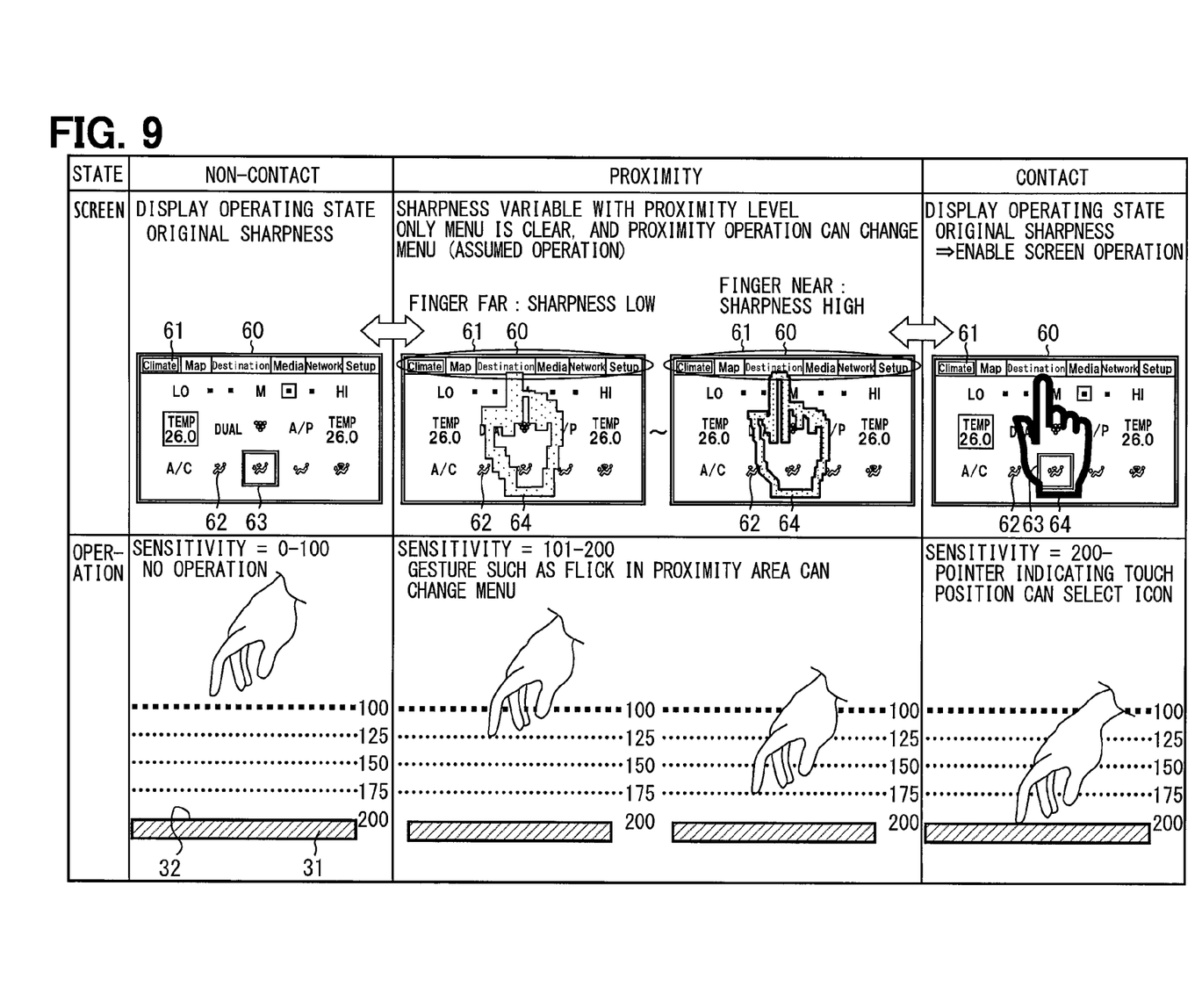
FIG. 9 is an explanatory drawing illustrating an input operation and a change in image associated with the movement of a finger as a function of the operation distance from the touch sensor to the finger in a remote operation device according to a second embodiment.

FIG. 9 illustrates a display image 60 accompanying a finger operation in a second embodiment. The second embodiment is difference from the first embodiment in that the target for reducing the sharpness in the display image 60 in the proximity is changed from the icon 62 to the pointer 64 when the operation state of a finger is the proximity.

The pointer 64 on the display image 60 indicates the corresponding position of a finger over the operation surface 32. For example, the pointer 63 is designed as a hand, and the index finger (fingertip) thereof indicates the position of a finger in the finger operation. Alternatively, the pointer 64 may adopt an arrow as the basic design. The pointer 64 is displayed in the display image 60 when the contact state of a finger is contact and proximity.

As illustrated in FIG. 9, the sharpness of the pointer 64 is changed in a sequentially reduced to be below the original sharpness in the proximity 1 screen at S180, the proximity 2 screen at S200, and the proximity 3 screen at S220 of FIG. 6 explained in the first embodiment.

Also in the present embodiment, as is the case with the first embodiment, the operator can understand easily the proximity state or the contact state of a finger to the operation surface 32, according to the sharpness of the pointer 64. Therefore, it is possible to determine the operation point to the display image 60, without requiring excessive attention to other than the display image 60; accordingly the operation becomes definitely clear.

(Third Embodiment)

Figure 10:
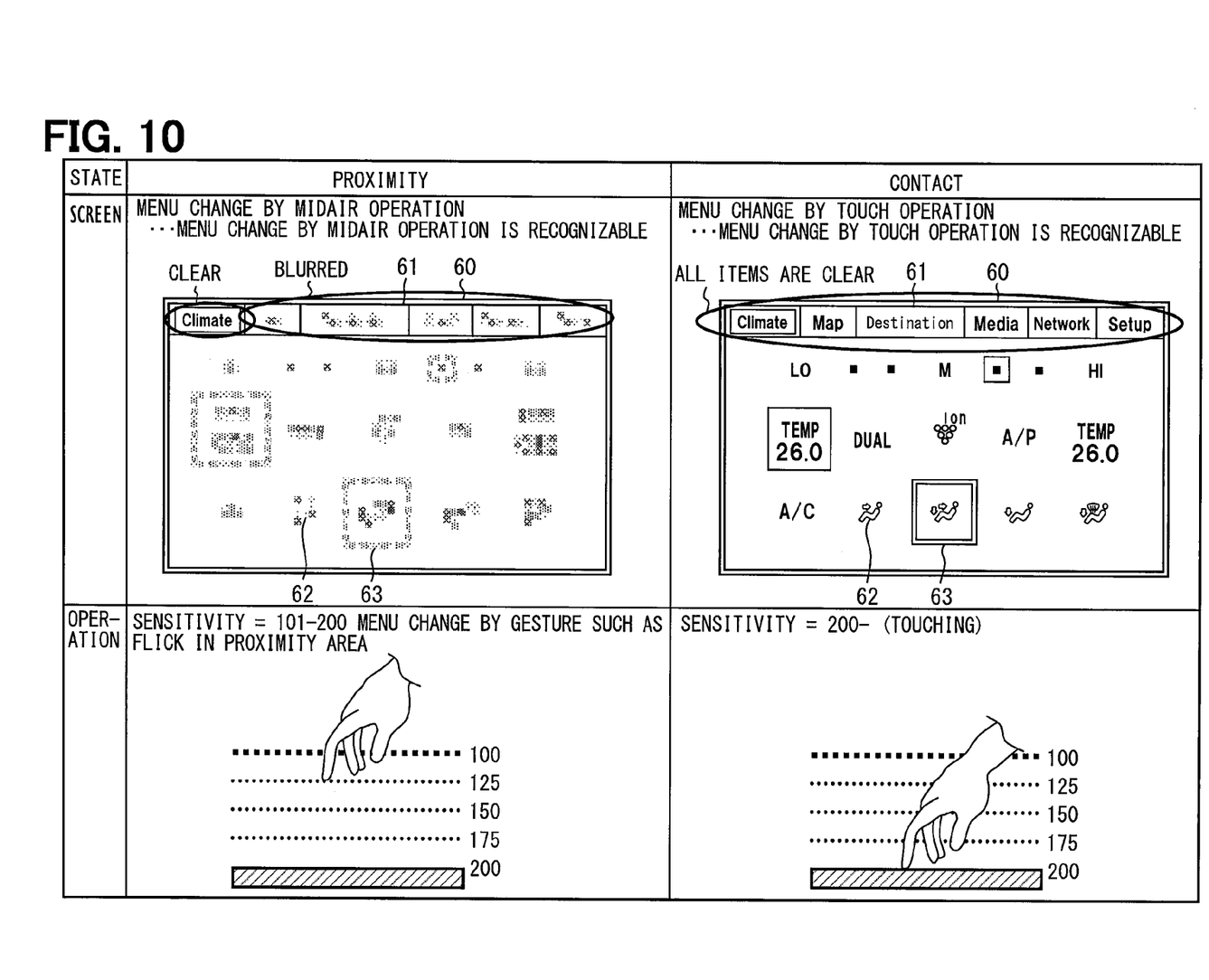
FIG. 10 is an explanatory drawing illustrating an input operation and a change in image associated with the movement of a finger as a function of the operation distance from the touch sensor to the finger, in a remote operation device according to a third embodiment.

FIG. 10 illustrates a display image 60 accompanying a finger operation in a third embodiment. The third embodiment is different from the first embodiment in that the sharpness of the menu 61 as well as the icon 62 and the focus 63 of the display image 60 is reduced according to the operation state of a finger.

In the present embodiment, when an operator operates the menu 61, all the menu items of the menu 61 in the contact screen at S140 of FIG. 6 explained in the first embodiment are displayed with the original sharpness as is the case with the icon 62 and the focus 63. In the proximity 1 screen at S180, the proximity 2 screen at S200, and the proximity 3 screen at S220 of FIG. 6, the sharpness of the menu 61 is changed in a sequentially reduced to be below the original sharpness, as is the case with the icon 62 and the focus 63. However, the menu item selected in the menu 61 is always maintained clear, irrespective of the operation state of the finger.

Also in the present embodiment, as is the case with the first embodiment, the operator can understand easily the proximity state or the contact state of a finger to the operation surface 32, according to the sharpness of the menu 61. Therefore, it is possible to easily determine the operation point to the display image 60, without requiring excessive attention to other than the display image 60; accordingly the operation becomes definitely clear.

When reducing the sharpness of at least part of the display image 60, that is, the menu 61, the operation control unit 33 always maintains the original sharpness as for the menu item selected by the operator. According to this configuration, whatever operation state the finger is in, the operator can recognize easily the menu item which is selected currently.

(Other Embodiments)

In each of the embodiments described above, the operation state of a finger in the proximity state is classified into three states: the proximity 1, the proximity 2, and the proximity 3. However, the operation state is not limited to this. One proximity state, two proximity states, or four or more proximity states may be set on an as-needed basis.

In the first embodiment and the second embodiment, when the operation state of a finger is the proximity state, the sharpness of the icon 62 or the pointer 64 in the display image 60 is reduced. However, this is not limiting. The sharpness of both the icon 62 and the pointer 64 may be reduced. Alternatively, the sharpness of other parts in the display image 60 may be reduced.

The touch sensor 31 of the capacitive type is employed as the detector (an example of the detection means). However, this is not limiting. Another touch sensor of a pressure-sensitive type may be employed.

A push switch may be provided in the remote operation device 100. When confirming contents (an icon, etc.) selected by the finger operation, this push switch may be push down to make the confirmation.

Embodiments and configurations of the present disclosure have been illustrated in the above; however, embodiments and configurations according to the present disclosure are not limited to respective embodiments and configurations illustrated in the above. Embodiments and configurations which are obtained by combining suitably technical components disclosed in different embodiments and configurations are also within the scope of embodiments and configurations of the present disclosure.

What is claimed is:

1. An input device
separated from a display unit that switchably displays images hierarchized in a plurality of hierarchy levels and
configured to input a finger operation of a user to an operation surface to operate the images,
the input device comprising:
a detector that detects an operation state of the finger to the operation surface at a time of the finger operation; and
a controller that, when determining that the operation state detected by the detector is a proximity state, reduces sharpness of at least part of the image displayed on the display unit as compared with when determining that the operation state detected by the detector is a contact state, wherein the contact state is a state in which the finger is in contact with the operation surface and the proximity state is a state in which the finger is proximity to the operation surface, wherein the image is displayed with menu items indicating classifications of the images of a specified hierarchy level of the plurality of hierarchy levels, and when reducing the sharpness of the at least part of the image, the controller maintains the menu items at the same sharpness as in the contact state.

2. The input device according to claim 1, wherein
in the proximity state, the controller reduces the sharpness of the image with increasing distance of the finger from the operation surface.

3. The input device according to claim 1, wherein
the at least part of the image, of which the sharpness is reduced, includes an icon for operating the image or a pointer indicative of a position of the finger at the time of the finger operation.

4. The input device according to claim 1, wherein
when determining that the operation state detected by the detector is a noncontact state in which the finger recedes from the operation surface further than in the proximity state, the controller maintains the sharpness of the image displayed on the display unit to the sharpness in the contact state.

5. An input device
separated from a display unit that switchably displays images hierarchized in a plurality of hierarchy levels and
configured to input a finger operation of a user to an operation surface to operate the images,
the input device comprising:
a detector that detects an operation state of the finger to the operation surface at a time of the finger operation; and
a controller that, when determining that the operation state detected by the detector is a proximity state, reduces sharpness of at least part of the image displayed on the display unit as compared with when determining that the operation state detected by the detector is a contact state, wherein the contact state is a state in which the finger is in contact with the operation surface and the proximity state is a state in which the finger is proximity to the operation surface, wherein the image is displayed with menu items indicating classifications of the images of a specified hierarchy level of the plurality of hierarchy levels, and when reducing the sharpness of the at least part of the image, the controller maintains, of the menu items, only a menu item selected by the user at the same sharpness as in the contact state.

6. The input device according to claim 5, wherein
in the proximity state, the controller reduces the sharpness of the image with increasing distance of the finger from the operation surface.

7. The input device according to claim 5, wherein
the at least part of the image, of which the sharpness is reduced, includes an icon for operating the image or a pointer indicative of a position of the finger at the time of the finger operation.

8. The input device according to claim 5, wherein
when determining that the operation state detected by the detector is a noncontact state in which the finger recedes from the operation surface further than in the proximity state, the controller maintains the sharpness of the image displayed on the display unit to the sharpness in the contact state.

* * * * *